Patented June 24, 1952

2,601,497

UNITED STATES PATENT OFFICE 2,601,497

FURFURYL ALCOHOL RESINS

Lloyd H. Brown, Chicago, Ill., assignor to The Quaker Oats Company, Chicago, Ill., a corporation of New Jersey No Drawing. Application January 14, 1950, Serial No. 138,698

1 Claim. (Cl. 260—67)

This invention relates to synthetic resins derived from furfuryl alcohol and formaldehyde and to methods and steps of making the same.

It is well known in the arts that resins can be made from furfuryl alcohol and formaldehyde. Heretofore, however, when the resins prepared according to the methods described in the prior art were advanced to a stage beyond a viscous liquid a rubbery gel was obtained.

In accordance with the present invention, solid, brittle, fusible and soluble resins are formed by heating furfuryl alcohol and formaldehyde in the presence of an acidic catalyst followed by neutralization and dehydration under a vacuum to remove volatile components. As a modification of the invention, resins of similar characteristics may be produced by condensing furfuryl alcohol with itself.

These new resins are useful in the preparation of solutions for protective coatings and varnishes, and for impregnating and laminating purposes, and as molding powders they may be used in the preparation of cast and molded products. In connection with the latter use, the resins may be used in conjunction with suitable fillers, such as cellulosic materials, asbestos fibers, glass wool and the like. When used for laminating purposes or in the preparation of cast and molded products the ability of the resin to cure under alkaline or mildly acidic conditions is of particular value. Resins prepared from furfuryl alcohol and formaldehyde in accordance with the disclosures given in the prior art must be cured at a pH of about 3 or less. Under such conditions of acidity cellulosic fillers are attacked and weakened and metallic molds are stained. Since the resins prepared in accordance with my invention can be cured at a pH of 7 or more, those disadvantages are eliminated. Surface coatings containing the resins are particularly useful as a sealer or finishing coat for table tops of wood and similar materials and for wire.

In carrying out the present invention, furfuryl alcohol and formaldehyde were heated in the presence of an acidic material at temperatures which may vary from about 20 to 150° C. and for a period varying from ½ to 5 hours or longer. The reaction product so formed is a viscous liquid which after neutralizing by the addition of an alkali to a pH of about 4 to 8 and dehydrating under a vacuum to remove volatile components, yields a brittle, solid, fusible and soluble resin. The resins so produced are soluble in acetone, mixtures of the lower aliphatic alcohols up to and including isopropyl alcohol with benzene or toluene, and partially soluble in ethyl acetate, alcohols alone, and aromatic hydrocarbons. If desired, curing catalysts such as hexamethyleneamine or a cation exchange resin may be added to the mixture prior to dehydration.

The yields of solid, brittle, fusible and soluble resins obtainable by the process of this invention are dependent to a large extent upon the degree of advancement of the resin before it is dehydrated. As a general rule, the further the resin is advanced prior to dehydration the greater the yield. The upper practical limit of the degree of advancement is dependent upon the control methods available, formaldehyde content and catalyst concentration. As a measure of advancement of the resin I depend upon viscosity determinations; however, when the proper degree of advancement is attained the resulting liquid resin is too viscous for viscosity determinations by means of a viscosimeter. I, therefore, resort to the so-called "string" method for viscosity measurement. In this method a portion of the resin prior to its neutralization is placed upon a cool plate, the surface of the resin touched with the finger, and then upon withdrawing the finger vertically a "string" of resin is formed and the more viscous the resin the greater the length of the string before it breaks. Following the foregoing procedure a resin which will produce a string of about ¼ to 18" or more is satisfactorily advanced for my purposes. In accordance with my invention I have obtained yields of solid, brittle, soluble, fusible resins up to 95% based upon the quantity of furfuryl alcohol used.

During initial condensation of furfuryl alcohol and formaldehyde I prefer to use phosphoric acid as the catalyst, however, other mild acidic catalysts may be employed. Examples include both organic and inorganic acidic materials, such as formic, lactic, maleic, oxalic, p-toluene sulphonic, and trichloracetic acids and inorganic acidic salts, such as boron fluoride, ferric chloride, stannic chloride, etc. For neutralization of the resulting viscous resin any alkali may be used, but for convenience I prefer aqueous sodium hydroxide.

I have found that the proportions of furfuryl alcohol and formaldehyde in making the resin of the present invention may be varied rather widely if desired to meet any desired need in the final product as to flexibility, adhesiveness and hardness. Thus, for example, the amount of formaldehyde may vary from 0 to 2 or more moles per mole of furfuryl alcohol. I have found that although an excess of formaldehyde compared to furfuryl alcohol speeds up the reaction apparently not more than 0.6 mole of formaldehyde condenses with one mole of furfuryl alcohol; consequently, if an excess of formaldehyde is used, means for recovering unreacted formaldehyde must be employed for economical reasons. Resins of a high formaldehyde content appear to cure more rapidly and more on the alkaline side than those containing little or no formaldehyde.

In order to disclose the nature of the present invention still more clearly, the following illustrative examples will be given. It is to be understood, however, that the invention is not to be limited to the specific condition or details set forth in these examples except insofar as such limits are specified in the appended claim. Parts given are parts by weight.

EXAMPLE 1

Furfuryl alcohol (490 parts) and formaldehyde (243 parts) as a 37 per cent formalin solution were added to a reaction vessel equipped with a stirrer, thermometer and reflux condenser. 1.23 parts of phosphoric acid was then added as a 33 per cent aqueous solution. After stirring for 30 minutes at room temperature, external heat was applied at such a rate that in 75 minutes a temperature of 100° C. was attained. The mixture was refluxed for 2½ hours during which time the liquid darkened, became turbid and increased in viscosity to a one inch string. The mixture was allowed to cool and then 100 parts of a 5% sodium hydroxide solution was added to it which gave a pH of 6.5 (hydrion paper). The mixture was then dehydrated initially at slightly reduced pressure and finally under a pressure of 7 mm. the temperature at no time exceeding 155° C. The yield of resin was 423 parts or 86 per cent based on the amount of furfuryl alcohol used.

EXAMPLE 2

Furfuryl alcohol (520 parts) and phosphoric acid (216 parts) as a 33 per cent aqueous solution were added to a reaction vessel of the same type as used in Example 1. In this experiment external heat was applied immediately to the reaction vessel at such a rate that in one hour the temperature had risen to 128° C. The contents were then allowed to cool for 1½ hours at which time the temperature had dropped to 100° C. which was maintained for about 4¾ hours. After cooling over night, the resulting resin gave a string of about 1½". The resin was then heated to 107° C. for 7 hours which advanced it to a 10" string. Additional heating caused very little change in the viscosity of the resin. One hundred parts of a 5 per cent sodium hydroxide solution was added giving a pH of 5. This resin was dehydrated, first at atmospheric pressure and then under a vacuum (6 mm.) at a final temperature of 160° C. The yield of resin was 407.6 parts or 78.5 per cent of the furfuryl alcohol used.

EXAMPLE 3

Furfuryl alcohol (490 parts) and formaldehyde (101 parts) as a 37 per cent solution were added to the reaction vessel to which 3.66 parts of a 35 per cent solution of phosphoric acid was added. The mixture was stirred at room temperature for 15 minutes and then external heat was applied at such a rate that over a period of one hour the temperature rose to 100° C. After refluxing for 3½ hours the resulting resin gave a 4" string. A five per cent sodium hydroxide solution was then added until a pH of 7 was attained. The resulting resin was then dehydrated first at atmospheric pressure and then under a high vacuum (8 mm.) at a final temperature of 148° C. Four hundred twenty-three parts of resin was obtained which is equal to 86 per cent based on the amount of furfuryl alcohol used. A mixture consisting of 10 parts of the foregoing resin, one part hexamethyleneamine and sodium hydroxide to give a pH of 13 had stroke cure of 45 seconds.

The stroke cure has been defined as the time required for a resin to convert from a fusible or liquid condition at a definite temperature while being stroked with a spatula to a condition at which the spatula either no longer sticks to the resin or slides over it with relative ease. In practice about 2 cc. of the resin is placed on a hot plate, the temperature of which is adjusted to 145°–150° C., and stroked (approximately 90–100 strokes per minute) with the flat side of a spatula to smooth the resin into a square 2 to 3 inches on a side. The time in seconds for the resin to start to become stringy or gummy and the cure time are recorded.

EXAMPLE 4

Furfuryl alcohol (250 parts) and formaldehyde (414 parts) as a 37 per cent solution and 2 parts of phosphoric acid were added to the reaction vessel and mixed at room temperature. After one hour external heat was applied at such a rate that in a period of 2½ hours a temperature of about 100° C. was attained. The mixture was then refluxed for an additional 2¾ hours during which time it developed a 2" string. Unreacted formaldehyde was measured which indicated that only 0.6 mole of formaldehyde had been consumed per mole of furfuryl alcohol. The resulting resin was neutralized and washed, but during the latter process it advanced too far as it gelled after 15 minutes of dehydration.

EXAMPLE 5

The procedure of Example 4 was repeated with the exception that it was neutralized more carefully to a pH of 7. After dehydrating an hour at atmospheric pressure and up to 100° C. and then for five minutes at the same temperature under slightly reduced pressure, 237.4 parts of a resin was obtained. This represented a 95 per cent yield based on the amount of furfuryl alcohol used.

EXAMPLE 6

Formaldehyde (973 parts) of a 37 per cent solution and 18 parts of a 33 per cent solution of phosphoric acid were placed in the reaction vessel and heated to 85° C. and while at that temperature 2000 parts of furfuryl alcohol was added over a period of 2 hours. The temperature was then raised to 97° C. over a period of 1¼ hours and held at that temperature for 2⅙ hours. The resin so produced developed a 1" string. Portions of the resin were removed and neutralized to various pH's after which each was dehydrated. The sample of which the pH was adjusted to 3.5 and dehydrated under a vacuum for ¾ hour at 147° C. produced an insoluble gel. Another sample of the resin, the pH of which had been adjusted to 3.9 was dehydrated under a vacuum for 1⅙ hours at 145° C. This gave a brittle soluble resin. Likewise, a sample the pH of which had been adjusted to 4.0 and then dehydrated under a vacuum for 1½ hours at 150° C. gave a brittle soluble resin. A sample, the pH of which had been adjusted to 8.2 and dehydrated for ¾ of an hour at 140° C. gave a brittle soluble resin. Samples of the resin, the pH's of which had been adjusted to 8.9 and 9.5 produced an insoluble gel when they were dehydrated.

EXAMPLE 7

Formaldehyde (414 parts) and phosphoric acid (2 parts) were added to the reaction vessel and heated to 86° C. at which temperature 250 parts of furfuryl alcohol was added over a period of ½ hour. The resulting solution was heated to about 98° C. and held at that temperature for 2 hours after which the resulting product developed a 1″ string. Sodium hydroxide as a 5 per cent solution was then added to adjust the pH to 5.3. The resulting resin was dehydrated for 12 minutes under atmospheric pressure at a temperature of 130° C. and then for 15 minutes at 6 mm. pressure and a temperature up to 150° C. 151.7 parts of resin was produced which represented a yield of 61 per cent based on the amount of furfuryl alcohol used. The resulting resin and sodium hydroxide to give a pH of 10.5 possessed a stroke cure of 45 seconds.

EXAMPLE 8

Formaldehyde (195 parts) and approximately 3 parts of phosphoric acid were mixed at room temperature in the reaction vessel, heated to 80-90° C. and then at that temperature about 350 parts of furfuryl alcohol was added over a period of 45 minutes. The mixture was heated at reflux temperature and held at that temperature until the desired string was attained as noted below. After refluxing for the desired period of time, aqueous sodium hydroxide was added to the mixtures to adjust the pH to 5. The products obtained by refluxing the mixtures for 1¼, 1¾, 2⅔ and 3½ hours gave a string of 0″, ¼″, 12″ and over 18″, respectively. A brittle soluble resin was obtained after neutralizing and dehydrating each of the foregoing products with the exception that a rubbery gel was obtained from the sample which failed to give a string. A mixture consisting of 10 parts of this final resin; one part hexamethyleneamine and sufficient sodium hydroxide to give a pH of 10 had a stroke cure of 45 seconds. Acidifying this mixture with maleic acid to a pH of 3 caused the stroke cure to be increased to 1½ minutes.

EXAMPLE 9

In this example, three plywood panels were coated with a varnish consisting of the resin of Example 8 which produced the 18″ string before neutralizing and dehydrating dissolved in an equal weight of an alcohol-benzene solution in the presence of the addition products listed below.

*Panel number 1*

| | Parts |
|---|---|
| Varnish | 20.0 |
| Hexamethyleneamine | 1.0 |
| Maleic acid | 0.5 |

*Panel number 2*

| | Parts |
|---|---|
| Varnish | 20.0 |
| Maleic acid as a 1 per cent solution | 10.0 |

*Panel number 3*

| | Parts |
|---|---|
| Varnish | 20.0 | pH adjusted to 10 by the addition of 0.5 N NaOH in 90 per cent methyl alcohol.

The foregoing panels were baked for a period of 4 hours at 55° C., 2½ days at 100° C., and then 3½ hours at 150° C. The resistance of the coatings to strong alkali and strong acid was tested by placing a pellet of sodium hydroxide with a drop of water on each panel and at another spot on each panel a drop of 37 per cent hydrochloric acid. After 3 days the alkali and acid were removed. The coatings were unaffected.

I claim:

The method for producing a solid and fusible resin which comprises heating about 350 parts furfuryl alcohol and about 195 parts of a 37 per cent aqueous formaldehyde solution at reflux temperatures in the presence of water and a phosphoric acid catalyst until a viscous resin possessing a viscosity capable of producing about an 18 inch string is obtained, adjusting the pH of said viscous resin to a value of 4 to 8 by addition of alkali thereto and then dehydrating the resulting product at a temperature of between 100° to 160° C. and a pressure of between 6 mm. of mercury and atmospheric.

LLOYD H. BROWN.

REFERENCES CITED

The following references are of record in the file of this patent:

UNITED STATES PATENTS

| Number | Name | Date |
|---|---|---|
| 1,665,235 | Trickey | Apr. 10, 1928 |
| 2,323,334 | Kauth | July 6, 1943 |
| 2,343,972 | Harvey | Mar. 14, 1944 |
| 2,404,840 | Harvey | July 30, 1946 |
| 2,416,038 | Adams | Feb. 18, 1947 |
| 2,429,329 | Reineck | Oct. 21, 1947 |
| 2,471,438 | McWhorter | May 31, 1949 |

FOREIGN PATENTS

| Number | Country | Date |
|---|---|---|
| 595,208 | Great Britain | Nov. 28, 1947 |